US009199413B2

(12) United States Patent
Furuya et al.

(10) Patent No.: US 9,199,413 B2
(45) Date of Patent: Dec. 1, 2015

(54) METHOD FOR PRODUCING ORNAMENT

(75) Inventors: Eiji Furuya, Nagano (JP); Kei Komatsu, Nagano (JP); Kazutaka Ono, Nagano (JP)

(73) Assignee: FUJIGEN INC., Nagano (JP)

( * ) Notice: Subject to any disclaimer, the term of this patent is extended or adjusted under 35 U.S.C. 154(b) by 408 days.

(21) Appl. No.: 13/882,699

(22) PCT Filed: Oct. 31, 2011

(86) PCT No.: PCT/JP2011/006097
§ 371 (c)(1),
(2), (4) Date: Apr. 30, 2013

(87) PCT Pub. No.: WO2012/060088
PCT Pub. Date: May 10, 2012

(65) Prior Publication Data
US 2013/0228277 A1 Sep. 5, 2013

(30) Foreign Application Priority Data
Nov. 5, 2010 (JP) .................... 2010-248734

(51) Int. Cl.
*B29C 65/78* (2006.01)
*B29C 65/00* (2006.01)
(Continued)

(52) U.S. Cl.
CPC ............ *B29C 65/7847* (2013.01); *B27D 1/083* (2013.01); *B29C 65/00* (2013.01);
(Continued)

(58) Field of Classification Search
CPC .... B27D 1/083; B29C 65/7847; B29C 65/00; B29C 66/00145; B29C 65/16; B32B 2605/003; B32B 37/1009; B32B 37/12; B32B 37/10; B32B 7/02; B32B 27/40

USPC .......................................... 156/285, 286, 382
See application file for complete search history.

(56) References Cited

U.S. PATENT DOCUMENTS 4,769,100 A * 9/1988 Short et al. .................... 156/285
4,868,030 A * 9/1989 Mentzer et al. ............... 428/174
7,390,454 B2 * 6/2008 Ostrander et al. ............ 264/554

FOREIGN PATENT DOCUMENTS

JP   S63-094819 A   4/1988
JP   H04-083735 U   7/1992
(Continued)

OTHER PUBLICATIONS

International Search Report for PCT/JP2011/006097, Jan. 31, 2012.

*Primary Examiner* — Michael N Orlando
*Assistant Examiner* — Matthew Hoover

(57) ABSTRACT

In this method for producing an ornament (1), wherein an ornamental sheet (3) is bonded/affixed by means of a vacuum-press-bonding method to the convex front surface (21) of a substrate (2) provided with a convex front surface (21) and a concave back surface (22), a work-support base (6) is placed on a work placement surface (121a) formed on the upper surface of the suction chamber (120) of a vacuum-press-bonding device (100), and the substrate (2) is positioned by fitting an engagement protrusion (28) formed on the back surface of the substrate (2) covered by the ornamental sheet (3) to an engagement hole (68) at the work-support surface (61) formed on the upper surface of the work-support base (6). When bonding/affixing the ornamental sheet (3) to the substrate (2) by means of the vacuum-press-bonding device (100), position deviation of the substrate (2) is prevented by the engagement of the engagement hole (68) and the engagement protrusion (28).

7 Claims, 5 Drawing Sheets

(51) Int. Cl.
  *B32B 37/10* (2006.01)
  *B27D 1/08* (2006.01)
  *B32B 7/02* (2006.01)
  *B29C 35/16* (2006.01)
  *B32B 27/40* (2006.01)
  *B32B 37/12* (2006.01)
(52) U.S. Cl.
  CPC .......... *B29C66/00145* (2013.01); *B32B 37/10* (2013.01); *B32B 37/1009* (2013.01); *B29C 35/16* (2013.01); *B32B 7/02* (2013.01); *B32B 27/40* (2013.01); *B32B 37/12* (2013.01); *B32B 2605/003* (2013.01)

(56) References Cited

FOREIGN PATENT DOCUMENTS

| | | | |
|---|---|---|---|
| JP | H05-131545 | A | 5/1993 |
| JP | H05-293895 | A | 11/1993 |
| JP | H06-190919 | A | 7/1994 |
| JP | H08-192404 | A | 7/1996 |
| JP | H08-258132 | A | 10/1996 |
| JP | 3145882 | B2 | 1/2001 |
| JP | 3217117 | B2 | 8/2001 |
| JP | 3253654 | B2 | 11/2001 |
| JP | 3394058 | B2 | 4/2003 |

\* cited by examiner

METHOD FOR PRODUCING ORNAMENT

TECHNICAL FIELD

The present invention relates to a method for producing an ornament, wherein an ornament is produced by bonding/fixing an ornamental sheet to the convex front surface of a substrate having a convex front surface and a concave back surface. More specifically, the present invention relates to a method for producing an ornament wherein an ornamental sheet can be bonded/fixed to the convex front surface of a substrate without positional misalignment.

BACKGROUND ART

As methods for creating a high-class appearance in the interior panels of automobiles, the panels of audio equipment, the box portions of music boxes, the panel portions of furniture, and the like; there are known methods of finishing these portions in the front surfaces of wood patterns. Examples of methods for doing so include methods of bonding/fixing an ornamental sheet to the front surface of a substrate by using a vacuum press bonding method. Patent Documents 1 to 4 propose methods for bonding/fixing an ornamental sheet to the front surface of a substrate by using a vacuum press bonding method.

In the vacuum press bonding method disclosed in Patent Document 1, a workpiece comprising an ornamental sheet placed on the front surface of a substrate via an adhesive is placed on a workpiece mounting surface formed on the top surface of a suction chamber, a pressure chamber is lowered from above, and the ornamental sheet is pressed onto the substrate front surface by a flexible pressure sheet constituting the bottom surface of the pressure chamber. In this state, the pressure of the pressure chamber is increased to firmly pressure-bond the pressure sheet to the ornamental sheet and the workpiece mounting surface, and the pressure of the suction chamber is reduced to evacuate the space between the pressure sheet and the workpiece mounting surface via a suction hole formed in the workpiece mounting surface. The ornamental sheet thereby becomes pressed against the substrate surface with the pressure sheet firmly bonded to the ornamental sheet, and the ornamental sheet is bonded/fixed to the substrate surface by an adhesive.

In the vacuum press bonding methods disclosed in Patent Documents 2 to 4, a base for mounting a substrate is placed on the top surface of a suction chamber where a suction hole is formed, and a substrate and ornamental sheet are placed on the base. This makes it possible for the pressure sheet of the pressure chamber to be firmly bonded to a workpiece, encompassing a portion from the outer periphery to the rear surface, and the outer peripheral edge portion of the ornamental sheet can be reliably bonded/fixed to the substrate, encompassing a portion from the outer peripheral edge to the back surface.

PRIOR ART DOCUMENTS

Patent Documents

[Patent Document 1] JP 3145882 B
[Patent Document 2] JP 3394058 B
[Patent Document 3] JP 3217117 B
[Patent Document 4] JP 3253654 B

DISCLOSURE OF THE INVENTION

Problems to be Solved by the Invention

The vacuum press bonding methods disclosed in Patent Documents 1 to 4 are for bonding/fixing an ornamental sheet to the front surface of a substrate having a flat bottom surface. Because the bottom surface of the substrate is flat, the substrate can be stably placed on a workpiece mounting surface or a base for mounting a workpiece. Therefore, when the pressure chamber is lowered and the ornamental sheet and the substrate are pressed together by the pressure sheet, there is no positional misalignment of the substrate. Because the bottom, surface of the substrate is flat, when the pressure of the suction chamber is reduced to cause evacuation via the suction hole formed in the workpiece mounting surface, the substrate can be reliably chucked by suction to the workpiece mounting surface. Therefore, there is no positional misalignment of the substrate when the pressure of the pressure chamber is increased and the pressure sheet is pressed against the ornamental sheet on the substrate. There is accordingly no positional misalignment between the substrate and the ornamental sheet, and the ornamental sheet can therefore be properly bonded/fixed to a predetermined position on the substrate front surface.

However, in the case of a plate-shaped substrate in which the front surface is convex and the back surface is concave, there is little contact surface area between the concave back surface of the substrate and the flat workpiece mounting surface, and when the pressure sheet of the pressure chamber is pressed onto the substrate front surface from above the ornamental sheet, horizontal force is readily applied to the substrate. Therefore, when the pressure chamber is lowered and the pressure sheet is pressed onto the ornamental sheet on the substrate, horizontal force acts on the substrate on the workpiece mounting surface and the substrate position is readily misaligned. Particularly in cases such as when the flat shape of the substrate is bilaterally asymmetrical as seen from the pressure direction of the pressure sheet, and when the cross-sectional shape of the substrate is bilaterally asymmetrical as sectioned along the pressure direction of the pressure sheet, horizontal force readily acts on the substrate when the pressure sheet is pressed onto the substrate front surface from above the ornamental sheet.

When positional misalignment of the substrate has occurred, there is no problem if the ornamental sheet moves together with the substrate. However, at the point in time when the pressure sheet is pressed onto the ornamental sheet on the substrate, there are often instances where the adhesive is not exhibiting an adhesive function, the ornamental sheet to which the pressure sheet is firmly bonded does not move, and the position of only the substrate is misaligned.

In the case of a plate-shaped substrate such as one having a concave back surface, when the pressure of the suction chamber is reduced to evacuate the space between the workpiece mounting surface and the pressure sheet, the concave substrate back surface cannot be reliably chucked by suction to the flat workpiece mounting surface. A problem is therefore encountered in that the position of the substrate is readily misaligned on the workpiece mounting surface when the pressure sheet of the pressure chamber is pressed against the substrate from above the ornamental sheet while the pressure of the suction chamber is reduced to cause evacuation.

As is disclosed in Patent Documents 2 to 4, such positional misalignment of the substrate occurs also when the base for mounting the workpiece is placed on the to surface of the suction chamber and the substrate is placed on the based. Particularly, when the substrate is placed on the base for mounting the workpiece, the substrate comes to be disposed in a position raised above the top surface of the suction chamber. As a result, when the pressure chamber is lowered and the pressure sheet is pressed onto the ornamental sheet on the substrate and the top surface of the suction chamber, the substrate is pressed with greater force than in cases in which the substrate is placed on the top surface. Consequently, the position of the substrate is readily misaligned greatly.

The base for mounting the workplace is chucked by suction to the top surface of the suction chamber, but the substrate placed on top of the base for mounting the workpiece is not chucked by suction to the base. Therefore, when the pressure sheet of the pressure chamber is pressed against the substrate from above the ornamental sheet while the pressure of the suction chamber is reduced to create evacuation, there is a risk that the position of the substrate on the base will be misaligned it will not be possible to bond/fix the ornamental sheet to the predetermined position on the substrate front surface.

In the case of a plate-shaped substrate such as one having a concave back surface, when the pressure sheet of the pressure chamber is pressed against the substrate from above the ornamental sheet while the pressure of the suction chamber is reduced to create evacuation, another problem is that the substrate readily deforms.

An object of the present invention is to provide a method for producing an ornament, wherein an ornament is produced by bonding/fixing an ornamental sheet by a vacuum press bonding method to the convex front surface of a substrate having a convex front surface and a concave back surface, and the ornamental sheet can be bonded/fixed to the convex front surface of the substrate without any positional misalignment.

Means to Solve the Problems

To solve the problems described above, the present invention provides a method for producing an ornament in which an ornamental sheet is stacked and bonded on the convex front surface of a substrate having a convex front surface and a concave back surface, the method for producing an ornament characterized in comprising:

an ornamental sheet overlaying step for preparing a workpiece having an ornamental sheet positionally aligned and covering the convex front surface of the substrate via an adhesive;

a workpiece mounting step for placing a workpiece support base on a workpiece mounting surface formed on the top surface of a suction chamber in a vacuum press bonding apparatus, and placing the workpiece on a workpiece support surface formed on the top surface of the workpiece support base;

a pressure sheet pressing step for lowering a pressure chamber relative to the suction chamber, the pressure chamber being disposed directly above the suction chamber in the vacuum press bonding apparatus, and pressing a flexible pressure sheet which defines the bottom surface of the pressure chamber onto the ornamental sheet of the workpiece and the workpiece mounting surface from above; and an ornamental sheet bonding step for increasing the pressure in the pressure chamber to cause the ornamental sheet to be pressed against the convex front surface of the substrate from above by the pressure sheet, reducing the pressure in the suction chamber to evacuate a space between the workpiece mounting surface and the pressure sheet via an air intake hole formed in the workpiece mounting surface, and bonding/fixing the ornamental sheet to the convex front surface of the substrate by the adhesive;

the workpiece support base having a flat bottom surface portion capable of firmly bonding to the workpiece mounting surface, the convex workpiece support surface having a shape complementary to the concave back surface of the substrate, and a support-base-side engaging part formed in the workpiece support surface;

a substrate-side engaging part capable of mechanically engaging in the support-base-side engaging part being formed in the concave back surface of the substrate;

the workpiece being positioned relative to the workpiece support surface in the workpiece mounting step by mechanically engaging the substrate-side engaging part in the support-base-side engaging part; and positional misalignment of the substrate relative to the workpiece support surface being prevented in the pressure sheet pressing step by the mechanical engaging of the support-base-side engaging part and the substrate-side engaging part.

The workpiece support surface of the workpiece support base used in the method for producing an ornament of the present invention has a convex shape complementary to the concave back surface of the substrate. Consequently, the substrate of the workpiece can be placed in a stable state on the workpiece support surface. The substrate is not deformed by the pressure force acting from the pressure sheet in the ornamental sheet bonding step.

Furthermore, when the workpiece is placed on the workpiece support surface, the substrate is positioned relative to the workpiece support surface by causing the substrate-side engaging part formed in the concave back surface of the substrate of the workpiece to mechanically engage with the support-base-side engaging part. Therefore, when the workpiece is placed on the workpiece support surface, the workpiece can be positioned in a simple manner. There is also no positional misalignment of the workpiece relative to the workpiece support surface even if external force is exerted on the workpiece by the mechanical engaging of the substrate-side engaging part and the support-base-side engaging part. Therefore, in the pressure sheet pressing step and the ornamental sheet bonding step, there is no positional misalignment of the substrate even if horizontal force is exerted on the substrate by the pressure force exerted on the workpiece from the pressure sheet.

Therefore, according to the method for producing an ornament of the present invention, the ornamental sheet can be bonded/fixed using a vacuum press bonding method without the position of the ornamental sheet being misaligned relative to the convex front surface of the substrate.

For the substrate-side engaging part, an engaging protuberance protruding from the concave back surface of the substrate can be formed, and for the support-base-side engaging part, an engaging hole into which the engaging protuberance can be fitted can be formed opening in the workpiece support surface.

To position the workpiece and prevent positional misalignment of the substrate, a plurality of engaging protuberances are preferably formed, and a plurality of engaging holes into which the engaging protuberances can be fitted are preferably formed. To position the workpiece and ensure positional misalignment of the substrate can be reliably prevented, the cross-sectional shapes of the engaging protuberances and the engaging holes may be polygonal.

Next, a frame-shaped spacer is preferably disposed on the workpiece mounting surface in a state of enclosing the workpiece support base placed on the workpiece mounting surface, and in the pressure sheet pressing step, the pressure chamber is preferably lowered and the pressure sheet is preferably pressed from above onto the ornamental sheet of the workpiece and the frame-shaped spacer disposed on the workpiece mounting surface.

Doing so makes it possible to reduce the workpiece pressing force by the pressure sheet in the pressure sheet pressing step. As a result, positional misalignment of the substrate can be suppressed, and positional misalignment of the workpiece support base on the workpiece mounting surface can be prevented.

Next, there are cases in which the convex front surface of the substrate to which the ornamental sheet is bonded is provided with a first outer peripheral edge portion which faces directly upward perpendicular to the workpiece mounting surface or at an upward incline, and a second outer peripheral edge portion which faces directly horizontal parallel to the workpiece mounting surface or at a downward incline, when the substrate has been placed on the workpiece support surface. In this case, the workpiece support surface of the workpiece support base is preferably a surface having an overhanging surface portion which hangs outward past the outer peripheral edge of the first outer peripheral edge portion of the substrate, and a retracted surface portion which is retracted inward from the second outer peripheral edge portion of the substrate, when the workpiece has been placed.

In the pressure sheet pressing step, in the first outer peripheral edge portion side of the substrate, the pressure sheet is pressed in a firmly bonded state onto the ornamental sheet and the end surfaces of the substrate, from the outer peripheral edge portion of the ornamental sheet covering the first outer peripheral edge portion to the overhanging surface portion of the workpiece support surface. Therefore, in the ornamental sheet bonding step, the edge end portions of the ornamental sheet can be reliably bonded/fixed to the edge ends of the first outer peripheral edge portion of the substrate.

Similarly, in the pressure sheet pressing step, in the second outer peripheral edge portion side of the substrate, the pressure sheet is pressed in a firmly bonded state onto the ornamental sheet and the end surfaces of the substrate, from the outer peripheral edge portion of the ornamental sheet covering the second outer peripheral edge portion to the retracted surface portion f the workpiece support surface. Therefore, in the ornamental sheet bonding step, the edge end portions of the ornamental sheet can be reliably bonded/fixed to the edge ends of the second outer peripheral edge portion of the substrate.

MODE FOR CARRYING OUT THE INVENTION

Embodiments of the method for producing an ornament of the present invention are described below with reference to the drawings.

(Configuration of Ornament)

Figure 1:
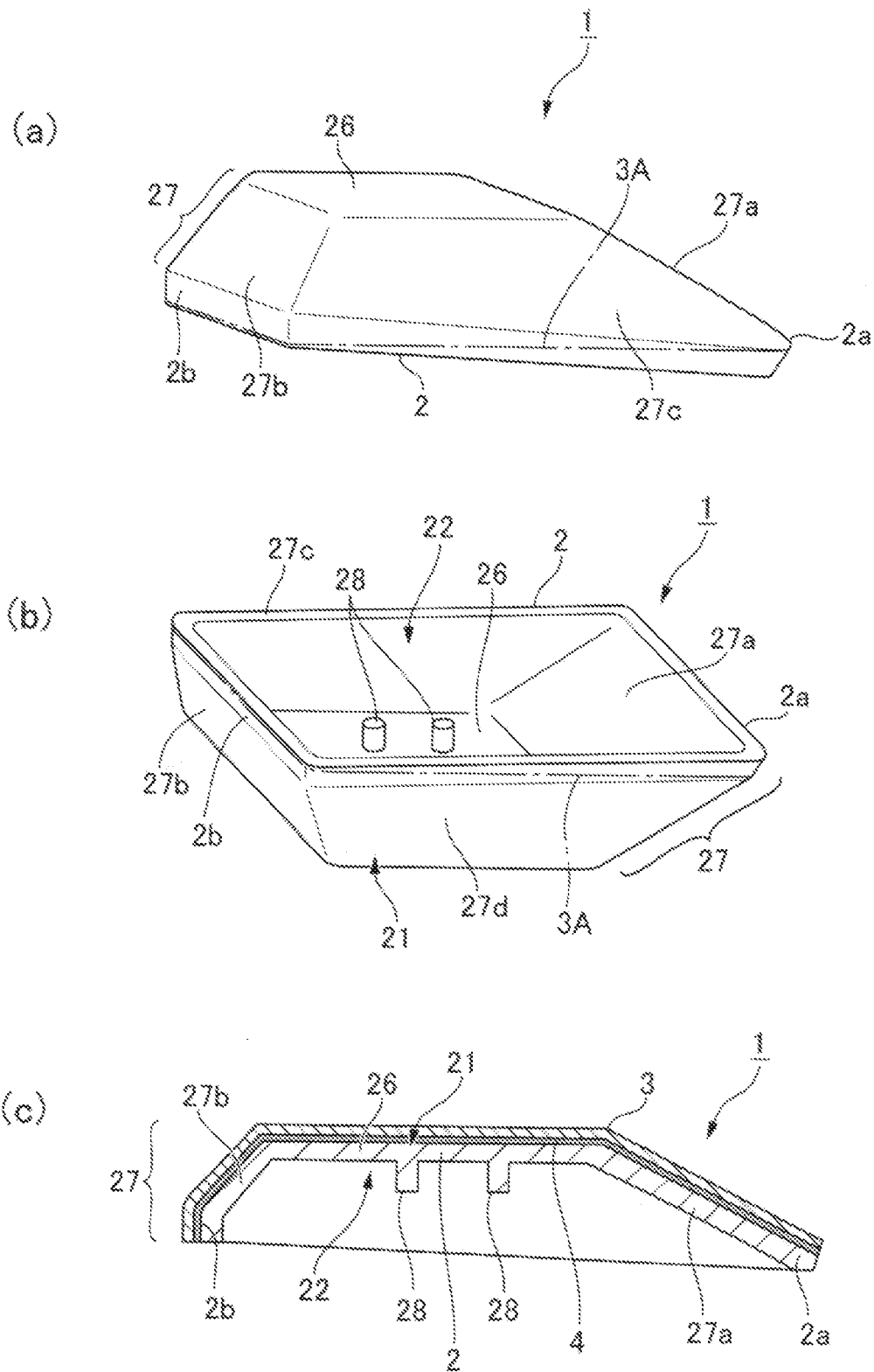
FIG. 1 contains a front surface perspective view, a back surface perspective view, and a cross-sectional view showing an example of an ornament produced by the production method of the present invention.

First, FIG. 1 is referenced to describe an ornament produced by the production method of the present invention. The ornament 1 shown in FIG. 1 is a member constituting an interior panel of an automobile, a panel of audio equipment, the box portion of a music box, a panel portion of furniture, or the like, and the ornament has a substrate 2 which defines the shape of the ornament 1 and an ornamental sheet 3 bonded/fixed to the substrate 2 by an adhesive 4.

The substrate 2 has an overall prismoidal shape composed of plate members of substantially constant thickness, and comprises a convex front surface 21 and a concave back surface 22. The substrate 2 is a molded article made of a resin or a metal, and in the case of a metal, a metal material made of aluminum, an aluminum alloy, magnesium, or a magnesium alloy can be used.

The substrate 2 comprises a top plate 26, and four side plates 27 (side plates 27a, 27b, 27c, 27d) protruding toward a concave back surface 22 from the outer peripheral edge of the top plate 26. Of the four side plates 27, the side plate 27a extends at an incline to the back surface from the outer peripheral edge of the top plate 26. The distal end of the side plate 27a is a first outer peripheral edge portion 2a wherein the front surface faces upward at an incline. The side plate 27b extends at an incline to the back surface from the outer peripheral edge of the top plate 26, and the distal end thereof is bent downward. This distal end is a second outer peripheral edge portion 2b wherein the front surface faces directly horizontal.

The ornamental sheet 3 is composed of a veneer sheet or the like, and is bonded to the convex front surface 21 of the substrate 2 by the adhesive 4 so as to cover the entire top plate 26 and the side plates 27. Specifically, the bonding of the ornamental sheet 3 reaches the edge ends of the first outer peripheral edge portion 2a and the second outer peripheral edge portion 2b, and the ornamental sheet is bonded by the adhesive 4 so as to entirely cover the side plates 27, as shown by the single-dash line 3A in FIGS. 1(a) and (b).

Engaging protuberances 28 (substrate-side engaging parts) are formed in the concave back surface 22 side of the substrate 2. The engaging protuberances 28 are molded at the same time as the main body portion of the substrate 2 on the concave back surface 22 side of the top plate 26 when the substrate 2 is molded. The protruding height of the engaging protuberances 28 from the concave back surface 22 is fairly small in comparison with the side plates 27, and the engaging protuberances therefore do not cause any hindrance even when left in the completed ornament 1. One or more engaging protuberances 28 can be formed, and in the present example, two columnar engaging protuberances 28 are formed in positions separated by a predetermined distance.

(Workpiece Support Base)

Figure 2:
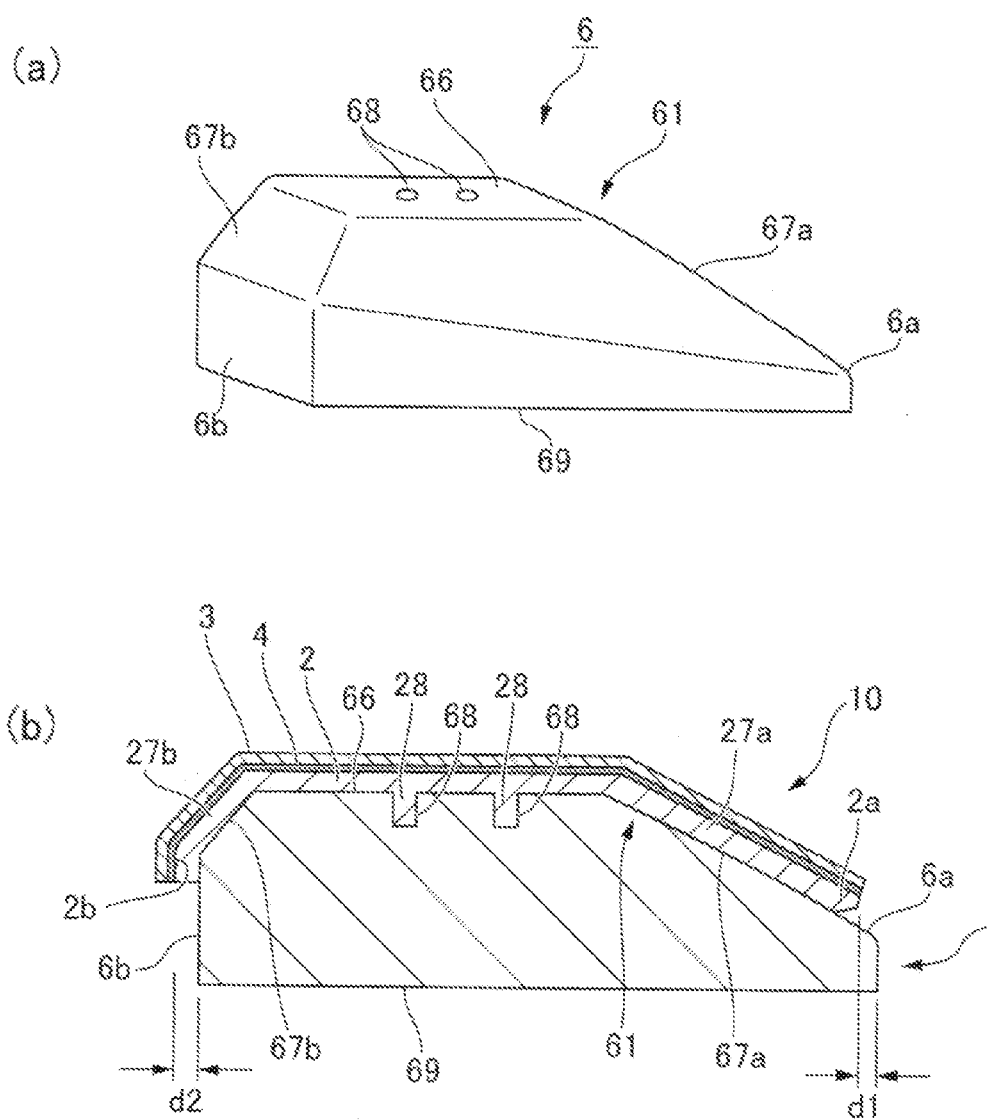
FIG. 2 contains a perspective view showing an example of a workpiece support base used in the production method of the present invention and a cross-sectional view of a state in which the workpiece has been placed.

Next, FIG. 2 is referenced to describe an example of a workpiece support base suitable for use in the production of the ornament 1. The workpiece support base 6 shown in FIG. 2 is a base made of a solid resin, wood, or a metal, and is used in order to place the substrate 2 covered by the ornamental sheet 3 when the ornamental sheet 3 is bonded/fixed to the convex front surface 21 of the substrate 2 by a vacuum press bonding method described hereinafter. The workplace support base 6 comprises a bottom surface 69 composed of a flat surface, and a convex workpiece support surface 61 having a convex shape (a prismoidal shape) complementary to the concave back surface 22 of the substrate 2.

The workplace support surface 61 comprises a top surface part 66 which overlaps the top plate 26 of the substrate 2 and bears the concave back surface 22 side of the top plate 26, and formed in this top surface part 66 are two engaging holes 68

(support base-side engaging parts) for fitting in the engaging protuberances 28 formed in the concave back surface 22 of the substrate 2. In the present example, the entire bottom surface 69 of the workpiece support base 6 is a flat surface, and a concavity may be formed in part of the flat bottom surface 69. Another option is that the center portion of the bottom surface 69 be a flat surface, and the outer peripheral portion of the bottom surface 69 be an inclined surface that is inclined upward.

The workpiece support base 6 has on the top surface a side surface 67a that overlaps the side plate 27a of the substrate 2 and bears the concave back surface 22 side of the side plate 27a, and the side surface 67a extend at a downward incline from the outer peripheral edge of the top surface part 66. The length dimension of the side surface 67a is greater than the length dimension of the side plate 27a of the substrate 2. Therefore, the workpiece support surface 61 of the workpiece support base 6 is provided with an overhanging surface portion 6a in the side where the first outer peripheral edge portion 2a is positioned in the convex front surface 21 of the substrate 2, and the overhanging surface portion 6a hangs outward past the edge end of the first outer peripheral edge portion 2a by a dimension d1.

The workplace support base 6 also comprises a side surface 67b that overlaps the side plate 27b of the substrate 2 and bears the concave back surface 22 side of the side plate 27b. In the side surface 67b, there is a downward bend in bottom end portion of the portion extending at a downward incline from the outer peripheral edge of the top surface part 66, corresponding to the shape of the side plate 27b, and this bottom end portion is a side surface portion 6b (a receded surface portion) which faces directly horizontal. The side surface portion 6b is in a position which, when the substrate 2 is placed on the workpiece support surface 61 of the workpiece support base 6, is receded inward by a dimension d2 from the second outer peripheral edge portion 2b in the convex front surface 21 of the substrate 2.

(Vacuum Press Bonding Apparatus)

Figure 3:
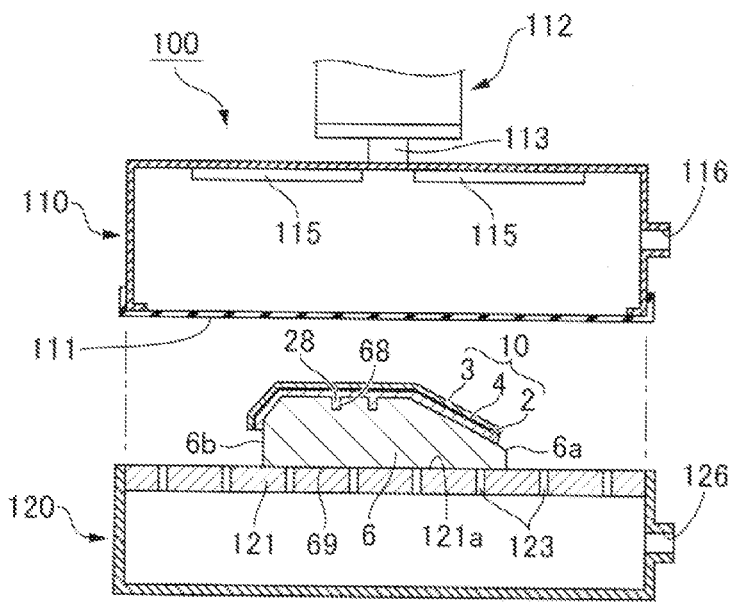
FIG. 3 contains explanatory drawings showing an example of the method for producing an ornament to which the present invention is applied, and an example of a vacuum press bonding apparatus.
Figure 3:
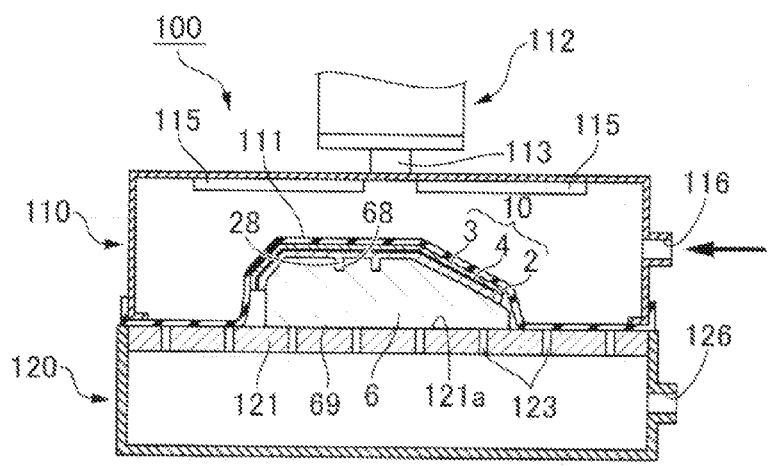
Figure 3:
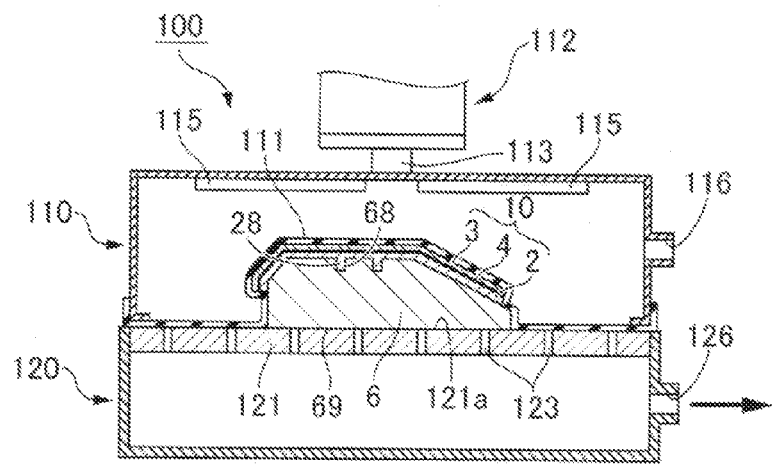

FIG. 3 is referenced to describe an example of a vacuum press bonding apparatus suitable for used in the method for producing an ornament of the present invention. FIG. 3(a) is an explanatory drawing showing a state in which a workpiece having the convex front surface 21 of the substrate 2 covered with the ornamental sheet 3 via the adhesive 4 is placed on the workpiece support base of the vacuum press bonding apparatus, FIG. 3(b) is an explanatory drawing showing a state in which a pressure chamber comprising a pressure sheet has been lowered, after which the pressure of the pressure chamber has been increased to press the pressure sheet onto the ornamental sheet, and FIG. 3(c) is an explanatory drawing showing a state in which the pressure of a suction chamber has been reduced to evacuate the space between the workpiece mounting surface and the pressure sheet.

Referring to FIG. 3(a) for the description, a vacuum press bonding apparatus 100 has a pressure chamber 110 connected to the distal end of a rod 113 of a raising/lowering device 112 composed of a cylinder device or the like, and a suction chamber 120 fixed so as to face the pressure chamber 110. The pressure chamber 110 comprises a flexible pressure sheet 111 affixed so as to close the lower opening. The pressure sheet 111 is a rubber elastic film made of silicon rubber or the like, and the pressure sheet is heat resistant and stretchable.

The ceiling surface of the pressure chamber 110 is provided with one or more heaters 115. The side surface of the pressure chamber 110 is provided with a supply/exhaust tube 116 for supplying and expelling air to and from the pressure chamber 110. An air supply apparatus (not shown) such as a compressor is connected to the supply/exhaust tube 116 via a three-way valve or the like. In addition to a compressor or the like, the air supply apparatus comprises a heating device for heating the supplied air, and heated air is supplied to the pressure chamber 110 via the supply/exhaust tube 116. The heating device of the air supply apparatus and the heaters 115 are controlled in terms of power supply amounts, power supply times, and other factors, and their generated heat amounts are controlled.

The suction chamber 120 has a box shape open at the top, and the top opening is sealed by a plate-shaped workpiece mounting base 121 containing numerous air intake holes 123. The top surface of the workpiece mounting base 121 constitutes a flat workpiece mounting surface 121a. In the side surface of the suction chamber 120 is formed a supply/exhaust tube 126 for evacuating and supplying air to the suction chamber 120. An air supply apparatus (not shown) such as a vacuum pump is connected to the supply/exhaust tube 126 via a three-way valve or the like. The pressure in the suction chamber 120 can be reduced and air can be supplied to the suction chamber 120 via the supply/exhaust tube 126.

(Method for Producing Ornament 1)

Figure 4:
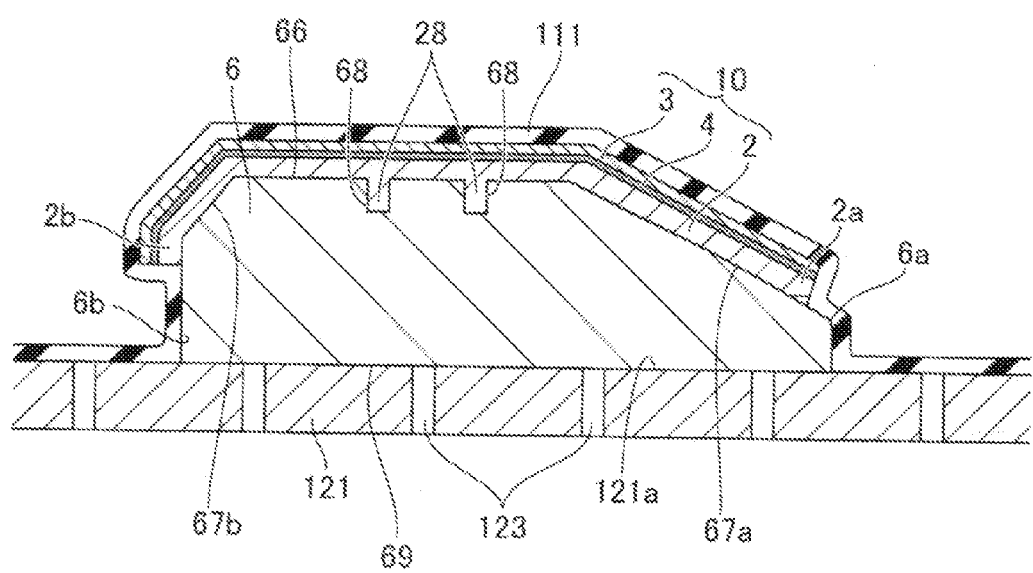
FIG. 4 is an explanatory drawing showing the ornamental sheet bonding step in the production method shown in FIG. 3.

FIGS. 3 and 4 are referenced to describe an example of a production method whereby an ornament 1 is produced using the vacuum press bonding apparatus 100. FIG. 4 is an enlarged partial cross-sectional view showing an enlargement of a part of FIG. 3(c).

First, as is shown in FIG. 2(b), a workpiece 10 is prepared on the convex front surface 21 of the substrate 2, the position of the workpiece being aligned over the ornamental sheet 3 to cover the sheet via the adhesive 4 (ornamental sheet overlapping step). To be more specific, a spray gun or the like is used to coat the convex front surface 21 side of the substrate 2 with the liquid adhesive 4, after which the ornamental sheet 3 is laid thereon and the position is aligned so that the front surface of the ornamental sheet 3 lightly traces the convex front surface 21 of the substrate 2. The ornamental sheet 3 is a veneer sheet in which a back surface sheet made of non-woven fabric, paper, or the like is attached to a veneer obtained by thinly slicing natural wood, for example, to a thickness of 0.25 mm, for example, and the ornamental sheet is cut to a predetermined size to match the size of the substrate 2. The adhesive 4 is a thermosetting or thermoplastic adhesive, and possible examples include a urethane-based adhesive, an epoxy-based adhesive, a rubber-based adhesive, a melamine-based adhesive, a phenol-based adhesive, an acryl-based adhesive, a cyano-based adhesive, and the like.

Next, the workpiece support base 6 is placed on the workpiece mounting surface 121a formed on the top surface of the suction chamber 120 in the vacuum press bonding apparatus 100, and the workpiece 10 is placed on the workpiece support surface 61 formed on the top surface of the workpiece support base 6, as shown in FIG. 3(a) (workpiece mounting step).

Specifically, the workpiece support base 6 is placed on the workpiece mounting surface 121a of the vacuum press bonding apparatus 100. The workpiece 10, which comprises the ornamental sheet 3 covering the convex front surface 21 of the substrate 2, is placed on the workpiece support surface 61 of the workpiece support base 6. Because the bottom surface 69 of the workpiece support base 6 is a flat surface, the workpiece support base 6 is mounted in a stable state on the workpiece mounting surface 121a. In this state, the bottom surface 69 of the workpiece support base 6 overlaps one or more air intake holes 123. The engaging protuberances 28 are also fitted into the engaging holes 68 of the workpiece support surface 61. This mechanical engaging causes the workpiece 10 to be positioned on the workpiece support surface 61.

Furthermore, the overhanging surface portion 6a of the workpiece support surface 61 hangs outward past the first outer peripheral edge portion 2a in the side where the first outer peripheral edge portion 2a is positioned in the convex front surface 21 of the substrate 2. The side surface portion 6b of the workpiece support surface 61 is in a position retracted inward from the second outer peripheral edge portion 2b of the convex front surface 21 of the substrate 2.

The pressure chamber 110, which is disposed directly above the suction chamber 120 in the vacuum press bonding apparatus 100, is then lowered relative to the suction chamber 120, and the flexible pressure sheet 111 defining the bottom surface of the pressure chamber 110 is pressed from above onto the ornamental sheet 3 of the workpiece 10 and the portion of the workpiece mounting surface 121a that surrounds the ornamental sheet, as shown in FIG. 3(*b*) (pressure sheet pressing step). During this time, the interior of the pressure chamber 110 is kept at ordinary pressure.

Next, the pressure in the pressure chamber 110 is increased and the ornamental sheet 3 is pressed against the convex front surface 21 of the substrate 2 from above by the pressure sheet 111, as shown by the arrow in FIG. 3(*b*). Specifically, heating air is supplied to the pressure chamber 110 by the air supply apparatus via the supply/exhaust tube 116, and the pressure sheet 111 is pressed onto the workpiece 10. At the same time, the pressure of the suction chamber 120 is reduced, the space between the workpiece mounting surface 121a and the pressure sheet 111 is evacuated via the air intake holes 123 formed in the workpiece mounting surface 121a, and the ornamental sheet 3 is bonded/fixed to the convex front surface 21 of the substrate 2 by the adhesive 4, as shown in FIG. 3(*c*) (ornamental sheet bonding step).

To be more specific, the air supply apparatus reduces the pressure in the suction chamber 120 via the supply/exhaust tube 126. As a result, the space between the workpiece mounting surface 121a and the pressure sheet 111 is evacuated via the air intake holes 123, and the space between the workpiece 10 and the pressure sheet 111 is therefore reduced in pressure, as shown in FIG. 3(*c*). Therefore, the pressure sheet 111 deforms along the workpiece 10 and the shape of the workpiece support base 6. Consequently, the pressure sheet 111 is firmly bonded to the front surface of the ornamental sheet 3 at a pressure of several to several tens of kg/cm$^2$, for example, uniformly pressurizing the ornamental sheet 3 toward the substrate 2, and the ornamental sheet 3 is therefore uniformly pressed onto the convex front surface 21 of the substrate 2. The workpiece support base 6 is also reliably chucked by suction to the workpiece mounting surface 121a.

During this time, the interior of the pressure chamber 110 is heated by heat from the heaters 115 or by heating of the air by a heating device of the air supply apparatus, and the workpiece 10 is heated via the pressure sheet 111. Therefore, the adhesive 4 is heated to a temperature of 100° C. or more, for example. Consequently, the fluidity of the adhesive 4 increases, and the ornamental sheet 3 is therefore uniformly pressed onto the front surface of the substrate 2. Consequently, the ornamental sheet 3 and the substrate 2 are uniformly bonded via the adhesive 4 over a pressurizing time of about several minutes.

As can be seen from FIG. 4, in the ornamental sheet bonding step as well, the engaging protuberances 28 of the substrate 2 of the workpiece 10 are fitted into the engaging holes 68 in the side of the workpiece support base 6. Even if horizontal force acts on the substrate 2, the position of the substrate 2 does not become misaligned from the workpiece support surface 61 by the mechanical engagement between these parts 68, 28.

In the workpiece support base 6, the overhanging surface portion 6a of the workpiece support surface 61 hangs outward past the first outer peripheral edge portion 2a in the side of the upward-inclined substrate 2 where the first outer peripheral edge portion 2a is positioned. Therefore, the pressure sheet 111 covers the first outer peripheral edge portion 2a and the overhanging surface portion 6a in a firmly contacted state from above, so as to span across these portions. Therefore, the ornamental sheet 3 is attached in a state of being reliably firmly bonded even to the first outer peripheral edge portion 2a. In the side of the first outer peripheral edge portion 2a, the pressure sheet 111 preferably deforms in conformity with the small ledge between the first outer peripheral edge portion 2a and the overhanging surface portion 6a, and air therefore does not remain readily between the pressure sheet 111 and the first outer peripheral edge portion 2a. Consequently, the ornamental sheet 3 covers the first outer peripheral edge portion 2a while firmly bonded, and the ornamental sheet 3 does not wrinkle readily.

The side surface portion 6b of the workpiece support surface 61 is retracted inward from the second outer peripheral edge portion 2b of the substrate 2 which is oriented directly horizontal. Therefore, with the pressure sheet 111 wrapped in against the bottom side of the second outer peripheral edge portion 2b, the second outer peripheral edge portion 2b is covered from a directly horizontal direction. Therefore, the ornamental sheet 3 is attached in a state of being reliably firmly bonded to the second outer peripheral edge portion 2b.

The evacuating of the suction chamber 120 is then stopped, and the supply of air to the pressure chamber 110 is stopped, after which the pressure chamber 110 is raised. The workpiece 10 is then taken out.

A coloring treatment that utilizes the grain of natural wood is thereafter performed as necessary on the front surface of the ornamental sheet 3, and a urethane-based or polyester-based transparent coating agent, for example, is applied, and the coating agent is then solidified. The workpiece 10 thereby becomes an ornament having a wood-grain patterned ornamental sheet 3 bonded to the front surface of the substrate 2. The workpiece 10 will be an ornament having a mirror sheen on the front surface if the front surface of the coating agent is also polished and buffed as necessary.

Because only the ornamental sheet 3 can be seen from the front surface of the workpiece 10, which is thus configured with the ornamental sheet 3 bonded/fixed to the convex front surface 21 of the substrate 2, the workpiece can be used as an attractive wood grain ornament 1 regardless of whether the substrate 2 is a plastic molded article or a metal molded article.

In the present example, after the pressure chamber 110 is lowered, the pressure of the pressure chamber 110 is increased, after which the pressure of the suction chamber 120 is reduced. Another option instead, after the pressure chamber 110 is lowered, is to begin evacuating the suction chamber 120 and then begin supplying air to the pressure chamber 110. Another option after the pressure chamber 110 has been lowered is to evacuate the suction chamber 120 and supply air to the pressure chamber 110 simultaneously.

(Another Example of Vacuum Press Bonding Apparatus)

Figure 5:
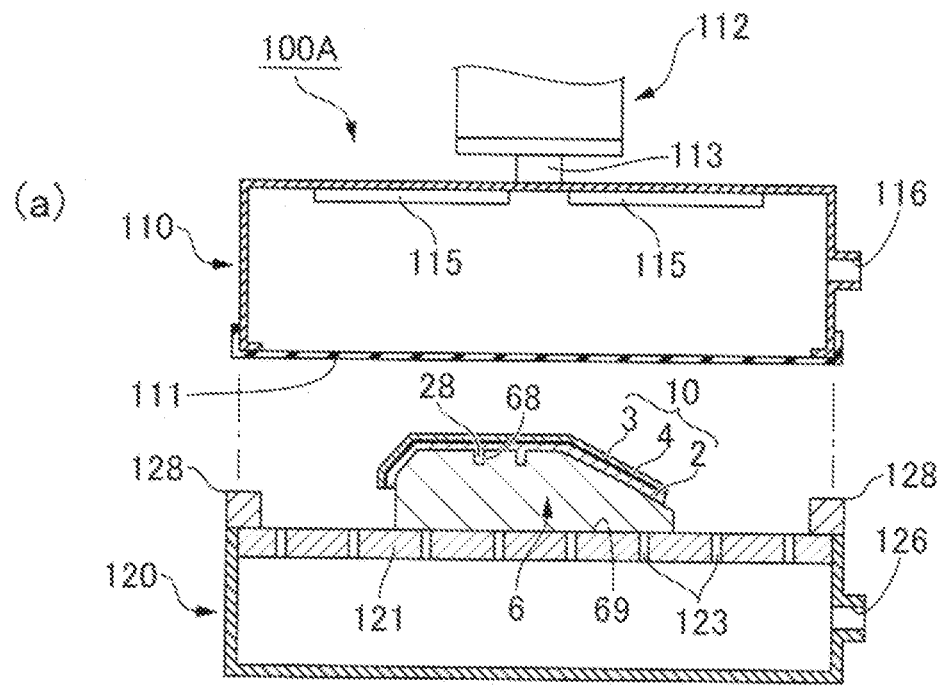
FIG. 5 contains explanatory drawings showing an example of a vacuum press bonding apparatus suitable for use in the production method of the present invention.
Figure 5:
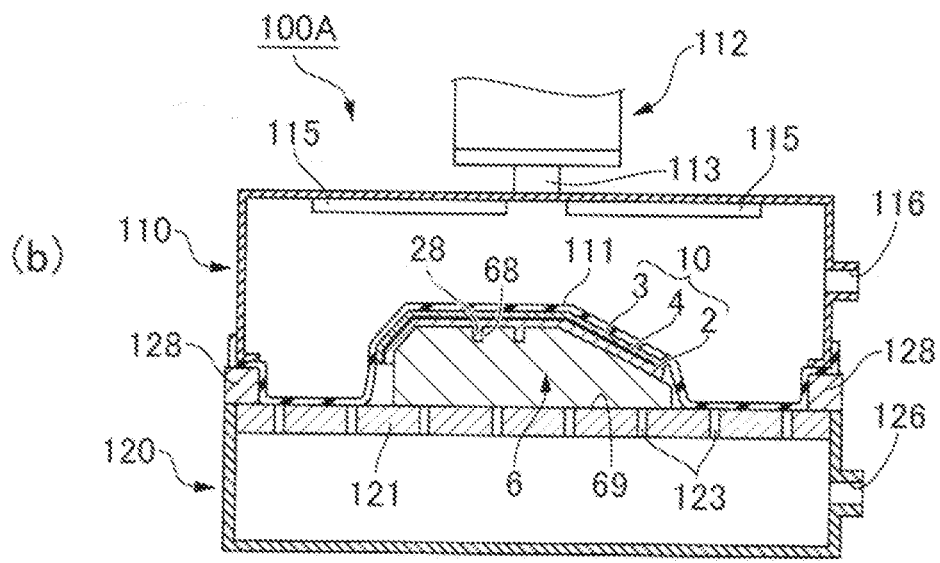

FIG. 5 contains explanatory drawings showing another example of a vacuum press bonding apparatus suitable for use in the method for producing an ornament of the present invention, and a method for producing an ornament using this vacuum press bonding apparatus. Because basic configuration of the vacuum press bonding apparatus is the same as the vacuum press bonding apparatus 100 described above, common portions are denoted by the same symbols and descriptions thereof are omitted.

The vacuum press bonding apparatus 100A shown in FIG. 5 has a pressure chamber 110 connected to the distal end of a rod 113 of a raising/lowering device 112, and a suction chamber 120 fixed so as to face the pressure chamber 110, and the pressure chamber 110 includes a pressure sheet 111 affixed so as to close the lower opening. The pressure sheet 111 is a rubber elastic film made of silicon rubber or the like, and the pressure sheet is heat resistant and stretchable. The ceiling surface of the pressure chamber 110 is provided with one or more heaters 115 that use infrared rays or far infrared rays. The suction chamber 120 comprises a workpiece mounting base 121.

In the vacuum press bonding apparatus 100A configured in this manner, a workpiece 10, which has an ornamental sheet 3 covering the convex front surface 21 side of a substrate 2, is placed on a workpiece support surface 61 of a workpiece support base 6, which is placed on a workpiece mounting surface 121a. Frame-shaped spacers 128 are provided to the workplace mounting surface 121a in positions where the spaces protrude toward the pressure chamber 110 and can contact the peripheral frame portions of the bottom surface of the pressure chamber 110. The frame-shaped spacers 128 are provided to the entire periphery of the outer peripheral ends of the workpiece mounting surface 121a. The frame-shaped spacers 128 may be configured as part of the workpiece mounting base 121, and other members may be attached to the workpiece mounting surface 121a. In any case, sufficient airtightness is ensured between the workpiece mounting surface 121a and the frame-shaped spacers 128. When the pressure chamber 110 lowers and contacts the frame-shaped spacers 128, sufficient airtightness is ensured between the pressure sheet 111 of the pressure chamber 110 and the frame-shaped spacers 128.

When an ornament 1 is produced using the vacuum press bonding apparatus 100A shown in FIG. 5, the same steps are performed as in the case described referring to FIGS. 3 and 4. After the pressure sheet pressing step has been performed, as shown in FIG. 5(b), because the frame-shaped spacers 128 are provided to the suction chamber 120, the pressure chamber 110 stops at a position that is higher by the height of the frame-shaped spacers 123 than in the case shown in FIG. 3. Therefore, even when the workpiece 10 is disposed at a higher position as seen from the workpiece mounting surface 121a due to the use of the workpiece support base 6, the force applied to the workpiece 10 can be reduced by the pressure sheet 111 when the pressure sheet 111 touches the workpiece 10 or when the pressure sheet 111 is pressed onto the workpiece 10. In other words, the pressure force can be reduced to approximately the same pressure force as when the workpiece 10 is placed directly on the workplace mounting surface 121a. Therefore, positional misalignment of the substrate 2 on the workpiece support base 6 can be reliably prevented. Consequently, the ornamental sheet 3 can be bonded at a predetermined position on the front surface of the substrate 2 without any positional misalignment.

Other Embodiments

In the examples described above, a plurality of columnar engaging protuberances 28 are provided, and a plurality of engaging holes 68 are provided into which the plurality of engaging protuberances 28 are fitted. Another option instead is to employ a structure in which one or more engaging protuberances 28 are fitted into one engaging hole 68. In this case, the engaging holes 68 are slits or square holes, and positional misalignment in which the substrate 2 turns about the engaging protuberance 28 is preferably prevented.

Instead of columnar engaging protuberances 28, plate-shaped or prismatic engaging protuberances 28 may be employed, and to fit with such engaging protuberances 28, the engaging holes 68 may be slits or squares of the same shape as the engaging protuberances. In this case, even if there is only one engaging protuberance 28 and one engaging hole 68, it is possible to prevent positional misalignment in which the substrate 2 rotates about the engaging protuberance 28.

In the examples described above, the engaging protuberances 28 are formed in the substrate 2 and the engaging holes 68 are formed in the workpiece support base 6. It is possible to conversely form the engaging protuberances in the workpiece support base 6 and form the engaging holes in the substrate 2.

Next, in the examples described above, an example is described in which the first outer peripheral edge portion 2a of the substrate 2 faced upward at an incline, but when the first outer peripheral edge portion 2a faces directly upward, the overhanging surface portion 6a may be provided hanging outward in the workpiece support base 6 past the first outer peripheral edge portion 2a. In the examples described above, an example is described in which the second outer peripheral edge portion 2b faces directly horizontal, but when the second outer peripheral edge portion 2b faces downward at an incline, a configuration may be employed in which a retracted surface portion retracted inward from the second outer peripheral edge portion is provided to the workpiece support base 6.

In the examples described above, a single workpiece support base 6 is placed on the workpiece mounting surface 121a and a single workpiece 10 is placed thereon. Another option instead is to place a plurality of workpiece support bases 6 on the workpiece mounting surface 121a and place the workpiece 10 on these workpiece support bases 6. A workpiece support surface capable of carrying a plurality of workpieces 10 can also be used as the workpiece support surface of the workpiece support base 6.

When an ornamental sheet 3 matching the size and shape of the substrate 2 is prepared, slits may be provided in the portions overlapping the corners of the substrate 2 to prevent wrinkles and the like.

The invention claimed is:

1. A method for producing an ornament, in which the ornament has a substrate having a convex front surface and a concave back surface, and an ornamental sheet stacked and bonded on the convex front surface of the substrate, the method for producing an ornament characterized in comprising:

an ornamental sheet overlaying step for preparing a workpiece having the ornamental sheet positionally aligned and covering the convex front surface of the substrate via an adhesive;

a workpiece mounting step for placing a workpiece support base on a workpiece mounting surface formed on a top surface of a suction chamber in a vacuum press bonding apparatus, and placing the workpiece on a workpiece support surface formed on an top surface of the workpiece support base;

a pressure sheet pressing step for lowering a pressure chamber relative to the suction chamber, the pressure chamber being disposed directly above the suction chamber in the vacuum press bonding apparatus, and pressing a flexible pressure sheet which defines a bottom surface of the pressure chamber onto the ornamental sheet of the workpiece and the workpiece mounting surface from above; and an ornamental sheet bonding step for increasing a pressure in the pressure chamber to cause the ornamental sheet to be pressed against the convex front surface of the substrate from above by the pressure sheet, reducing a pressure in the suction chamber to evacuate a space between the workpiece mounting surface and the pressure sheet via an air intake hole formed in the workpiece mounting surface, and bonding/fixing the ornamental sheet to the convex front surface of the substrate by the adhesive, wherein the workpiece support base has a flat bottom surface portion capable of firmly bonding to the workpiece mounting surface, the workpiece support surface having a convex shape complementary to the concave back surface of the substrate, and a support-base-side engaging part formed in the workpiece support surface; and the substrate has a substrate--side engaging part capable of mechanically engaging in the support-base-side engaging part, the substrate-side engaging part being formed in the concave back surface of the substrate, and wherein the workpiece is positioned relative to the workpiece support surface in the workpiece mounting step by mechanically engaging the substrate-side engaging part in the support-base-side engaging part; and positional misalignment of the substrate relative to the workpiece support surface is prevented in the pressure sheet pressing step by the mechanical engaging of the support-base-side engaging part and the substrate-side engaging part.

2. The method for producing an ornament according to claim 1, wherein an engaging protuberance protruding from the concave back surface of the substrate is formed as the substrate-side engaging part, and an engaging hole into which the engaging protuberance can be fitted is formed opening in the workpiece support surface as the support-base-side engaging part.

3. The method for producing an ornament according to claim 2, wherein a plurality of engaging protuberances are formed, and a plurality of engaging holes into which the engaging protuberances can be fitted are formed.

4. The method for producing an ornament according to claim 2, wherein the engaging protuberance and the engaging hole have a polygonal cross-sectional shape, respectively.

5. The method for producing an ornament according to claim 1, wherein a frame-shaped spacer is disposed on the workpiece mounting surface in a state of enclosing the workplace support base placed on the workpiece mounting surface, and in the pressure sheet pressing step, the pressure chamber is lowered and the pressure sheet is pressed from above onto the ornamental sheet of the workpiece and the frame-shaped spacer disposed on the workpiece mounting surface.

6. The method for producing an ornament according to claim 1, wherein the convex front surface of the substrate to which the ornamental sheet is bonded is provided with a first outer peripheral edge portion which faces directly upward perpendicular to the workpiece mounting surface or at an upward incline, when the substrate is placed on the workpiece support surface, and the workpiece support surface of the workpiece support base is provided with an overhanging surface portion which hangs outward past an outer peripheral edge of the first outer peripheral edge portion of the substrate, when the workpiece is placed.

7. The method for producing an ornament according to claim 6, wherein the convex front surface of the substrate to which the ornamental sheet is bonded is provided with a second outer peripheral edge portion which faces directly horizontal parallel to the workpiece mounting surface or at a downward incline, when the substrate is placed on the workpiece support surface, and the workpiece support surface of the workpiece support base is provided with a retracted surface portion which is retracted inward from the second outer peripheral edge portion of the substrate, when the workpiece is placed.

* * * * *